Dec. 30, 1924.  
W. M. BRADSHAW ET AL  
1,521,005  
REGULATOR SYSTEM  
Filed July 20, 1922
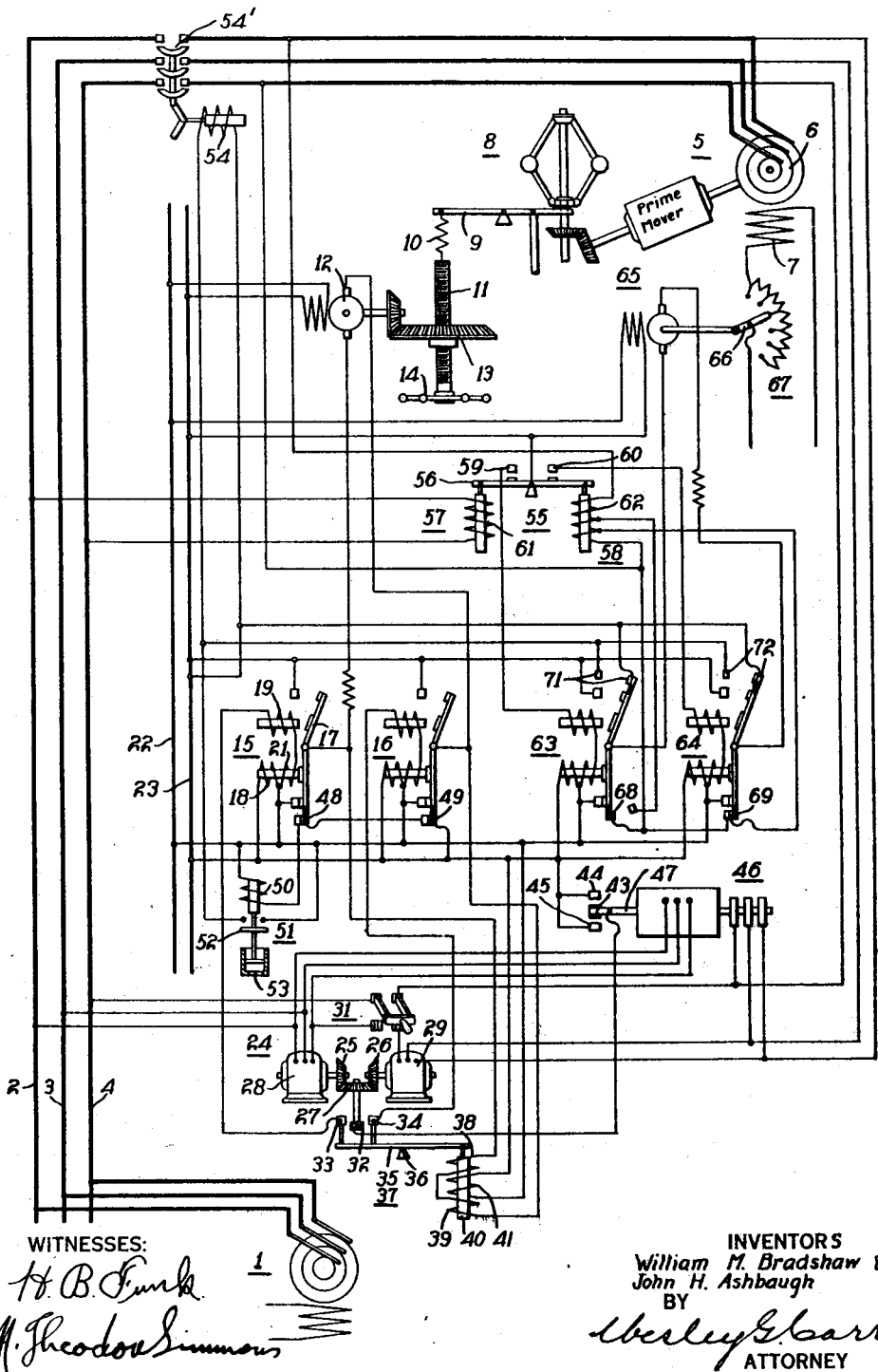
WITNESSES:
INVENTORS  
William M. Bradshaw &  
John H. Ashbaugh  
BY  
ATTORNEY Patented Dec. 30, 1924.

1,521,005

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA.

REGULATOR SYSTEM.

Application filed July 20, 1922. Serial No. 576,243.

*To all whom it may concern:*

Be it known that we, WILLIAM M. BRADSHAW, a citizen of the United States, and a resident of Wilkinsburg, in the county of Allegheny and State of Pennsylvania, and JOHN H. ASHBAUGH, a citizen of the United States, and a resident of Wilkinsburg, in the county of Allegheny and State of Pennsylvania, have invented a new and useful Improvement in Regulator Systems, of which the following is a specification.

Our invention relates to a system of control for a plurality of dynamo-electric machines and it has special relation to combined governing and regulating means therefor.

One object of our invention is to provide a system of the above-indicated character that shall be responsive to certain electrical characteristics of each of said machines to couple said machines in parallel relation when the characteristics of each correspond.

Another object of our invention is to provide a system of the above-indicated character that shall be responsive to the phase relationship of the currents of the respective machines and to the speeds and voltages thereof.

A still further object of our invention is to provide a system of the above-indicated character that shall govern the operation of one of the machines in accordance with the operation of the other of said machines.

In a system wherein there are one or more dynamo-electric machines connected to a power circuit, hereinafter referred to as the main machine, and it is desired to couple an additional or auxiliary machine to said circuit, it becomes highly important to withhold the actual connection of the auxiliary machine to the power circuit until certain electrical conditions thereof correspond to the electrical conditions of the power circuit and the operating characteristics of the main machine.

Thus, in operating a plurality of generating stations, an increase in load may require the addition of an auxiliary generating station to supply part of the load. The auxiliary generating station should not be connected to the line before it has attained a proper speed, and not until the current thereof is in phase coincidence with the current of the power circuit, and the voltage thereof is substantially the voltage of the line. Accordingly, the operation of the auxiliary station must be regulated to bring about the desired operation in order to prevent harmful effects upon the power circuit and the machines connected thereto.

The present invention contemplates preventing the premature coupling of the auxiliary generator to the power circuit by providing a mechanical differential, the opposite sides of which are controlled by synchronous motors operating respectively from the power circuit and the circuit of the auxiliary generator, an electroresponsive device adapted to be operated in accordance with the phase indications of the respective circuits and a voltage-balancing regulator that is operated in accordance with the voltage indications of the respective circuits. These mechanisms regulate the operation of the auxiliary generator and control the energizing circuit for the circuit breaker for coupling the auxiliary generator to the power circuit.

Our invention will be best understood from the accompanying drawing, wherein the single figure is a diagrammatic illustration of circuits and apparatus embodying our invention.

A generator 1, which will be hereinafter referred to as the main generator, is connected to a power circuit comprising conductors 2, 3 and 4. An auxiliary generator 5, having an armature 6 and a field-magnet winding 7, is adapted to be operated by a prime mover, such as a water-wheel. The prime mover may be controlled by any standard governor mechanism, such as a fly-ball governor 8. The governor 8 works upon the pivoted shaft 9, against the tension of the spring 10, which is adjustable by means of a screw 11. The screw 11 may be operated by means of a motor 12 through the illustrated gearing 13. It may also be operated by means of a hand-wheel 14.

The direction of rotation of the motor 13 may be controlled by reversing switches 15 and 16. The reversing switches respectively comprise a switch arm 17, a permanently energized holding coil 18, an operating coil 19 and a neutralizing coil 21. The coils are adapted to be energized from control bus bars 22 and 23. Normally, the holding coils 18 maintain the arms 17 in the illustrated position, thus close-circuiting the motor 12 for the purposes of dynamic braking.

In accordance with our invention, a differential mechanism 24 is provided for obtaining the relative speed indication of the generators 1 and 5. The differential mechanism 24 comprises a pair of bevel gear-wheels 25 and 26 co-operating to actuate the intermediate gear-wheel 27. The gear-wheel 25 is operated by means of a synchronous motor 28 that is connected to the power circuit 2, 3, 4. The gear-wheel 26 is operated by a synchronous motor 29 that is connected in circuit with the auxiliary generator 5. The circuits of the respective synchronous motors extend through a two-pole single-throw knife switch 31. It will be understood that the knife switch is symbolical of any manual or automatic means for controlling the operation of the synchronous motors, which operation is concurrent with the starting of the auxiliary generator 5. Such automatic means may be, for example, a frequency meter or a watt meter connected to the power circuit.

The differential mechanism 24 controls the movements of a contact member 32 to cause it to selectively engage contact members 33 and 34 that are respectively in circuit with the operating coils of reversing switches 15 and 16. The contact members 33 and 34 are mounted upon a lever arm 35 that is pivoted at 36 and has connected to it, on the opposite side of the pivot, an electromagnet 37. The electromagnet 37 comprises two differentially wound coils 38 and 39 that are respectively disposed upon the upper and the lower ends of the core member 40. There is centrally disposed upon the core member 40 a coil 41 that is connected across the control bus bars 22 and 23 so as to polarize the electromagnet 37. The coils 38 and 39 are in circuit with the reversible governor motor 12 so that the electromagnet 37 may be operated in one direction or the other by the counter-electromotive force of the motor 12. The coil 41 is continually energized and normally holds the core member 40 in its neutral or mid position. The coils 38 and 39 are differentially wound with respect to each other and are energized in accordance with the operation of the motor 12. One of the coils, 38 or 39, will create a flux in the same direction as the flux created by the coil 41, while the other differentially wound coil will create a flux in the opposite direction. The effect of a current through the coils 38 and 39 will, therefore, be to shift the point of maximum flux density upwardly or downwardly, depending upon which of the differential coils aids the coil 41 and which opposes this coil. The movement of the core armature will be in a direction to separate the contact members earlier than they would be normally separated, thereby speeding up the operation of the system as a whole by rendering the operation of this mechanism dead-beat, and also by preventing hunting action.

The circuit to the contact member 32 is completed through a contact member 43 that is operated by a wound rotor dynamo-electric machine 46 to selectively engage contact members 44 and 45. The primary winding of the machine 46 is energized from the power circuit 2, 3, 4, while the wound rotor of the machine is energized from the circuit of the auxiliary generator 5.

When the frequency of the auxiliary generator 5 is at variance with that of the power circuit 2, 3, 4, the shaft 47 of the machine 46 will be moved. The direction of movement will depend upon the phase relation of the respective currents. It will be noted that the contact members 44 and 45 are connected in parallel relation, so that, regardless of the phase relation of the respective currents, a circuit will be completed from the control bus bars 22 to the differential contact member 32.

The contact member 32 will be moved by the differential 24 into engagement with either the contact member 33 or the contact member 34. Reversing switches 15 and 16 will be energized to control the operation of the governor-setting motor 12, depending upon which of the contact members 33 and 34 is engaged. In one direction, the motor 12 will increase the tension upon the spring 10 and, therefore, raise the setting of the governor mechanism whereas, in the opposite direction, the tension upon the spring 10 will be lessened so as to lower the setting of the governor 8. The contact members that are engaged will be separated prior to the normal time of said separation by reason of the action of the electromagnet 37, which is energized proportional to the operation of the governor motor 12.

The reversing switches 15 and 16 respectively control auxiliary series-connected contact members 48 and 49. The circuit therethrough extends from the control bus bar 23 through contact members 49 and 48 and coil 50 of an electromagnet 51 to control bus bar 22. Electromagnet 51 operates a switch 52 and has a dash-pot 53 co-operating therewith to produce a time element in the operation thereof. The switch 52 completes a circuit from the control bus bar 22 through the coil 54 of the circuit breaker 54' to the control bus bar 23. The operation of this portion of the mechanism is substantially as follows:—

When the frequencies of the power circuit and the circuit of the auxiliary generator do not coincide, a circuit will be completed to the differential contact member. Since the frequencies of the respective circuits do not coincide, the speeds of the respective machines will be out of phase. Hence, the circuit will extend from the contact member that is controlled by the differential through one of the contact members 33 and 34 to control the operation of the governor motor 12 through its reversing switches 15 and 16. If either of the reversing switches 15 and 16 is moved to its operative position, the circuit through the contact member 48 or 49, carried thereby, will be interrupted and, hence, there will be no energization of the electromagnet 51.

When both of the reversing switches 15 and 16 are in the position indicated in the drawings, the energizing circuit for the electromagnet 51 will be complete. However, after the operation of synchronizing the generator 5 is begun, the only time at which the switches 15 and 16 will be in the position indicated in the drawings is, first, the transition period between reverse operations and, second, when the frequencies and speeds of the respective machines coincide. In the first instance, the time element of the dash-pot 53 will prevent the electromagnet 51 from completing the circuit to the actuating coil of the circuit-breaker 54'. When either of the contact members 48 or 49 is open, the circuit-breaker 54' cannot be operated. The second instance is the time at which it is desired to operate the electromagnet 51; that is to say, when the frequencies and speeds of the machines coincide so that there is no circuit to either of the reversing switches 15 and 16. The time element of the electromagnet 51 will be so arranged that there will not be opportunity for the frequencies or speeds of the respective machines to unbalance, after once becoming balanced, before the circuit-breaker will be closed.

Obviously, damage would occur if the circuit-breaker closed prior to the time the voltage of the auxiliary generator balanced that of the power circuit 2, 3, 4. Hence, the regulator 55 is provided, which comprises a pivoted beam 56, having electromagnets 57 and 58, respectively located on the opposite sides of the pivot, and contact members 59 and 60 that are also located on the opposite sides of the pivot of said beam. The electromagnet 57 has an energizing coil 61 that is connected across one phase of the power circuit 2, 3, 4. The electromagnet 58 has an energizing coil 62 that is connected across one phase of the circuit of the auxiliary generator. The contact members 59 and 60 respectively control the circuits to the operating coils of reversing switches 63 and 64, which are similar in construction and operation to the reversing switches 15 and 16. The reversing switches 63 and 64 control the operation of a motor 65 that is connected to the arm 66 of a rheostat 67, which is located in the circuit of the field-magnet winding 7 of the auxiliary generator.

When the auxiliary generator is started up, its voltage is below that of the voltage of the power circuit. Accordingly, the contact members 59 will be in engagement to complete the circuit to reversing switch 63, thereby operating the rheostat arm 66 to decrease the resistance in the circuit of the field-magnet winding 7 of the auxiliary generator. Simultaneously, the reversing switch 63 operates auxiliary contact members 68 to short-circuit a section of the coil 62 of the electromagnet 58 for the purpose of preventing hunting action. As the voltage of the generator 5 builds up, the regulator will be overbalanced in the opposite direction, so that contact members 60 will be closed to energize the reversing switch 64 and thereby weaken the excitation of the field-magnet winding 7 of the auxiliary generator. Simultaneously with the operation of the reversing switch 64, the auxiliary contact members 69 will be closed to insert in circuit a portion of the coils 62 for the purpose of preventing hunting action.

In order that the circuit breaker 54' may not be closed before the voltages of the machine coincide, the reversing switches 63 and 64 are provided with a set of auxiliary contact members 71 and 72, respectively. The contact members 71 and 72 are connected in parallel relation across the circuit to the coil of the circuit-breaker. Thus, if either of the reversing switches 63 or 64 is closed, the coil of the circuit-breaker is short-circuited, thereby preventing a premature operation of the circuit-breaker, as heretofore described. That is to say, the circuit-breaker cannot operate until the voltages of the two machines are substantially the same.

When it becomes desirable to connect the auxiliary generating station 5 to the power circuit 2, 3, 4, the station is started in the usual manner. Simultaneously therewith, the control device 31 is operated to complete the respective circuits of the synchronous motors 28 and 29 of the differential mechanism 24. It will be understood that the generator 1 is operating at a particular speed, depending upon the load carried thereby.

While the voltage of the auxiliary generator 5 is building up, its speed and the frequency of its current are considerably below those of the generator 1, which renders it undesirable to couple the generators in parallel relation. The difference in speed between the generators is indicated by the differential mechanism 24. Thus, the contact member will be caused to engage one of the contact members 33 or 34. The difference in frequency or phase relations of the currents is indicated by the electroresponsive device 46. The two devices 24 and 46 co-operate to control the operation of the reversing switches for the governor motor 12 and also the circuit to the coil of the main circuit breaker 54'. The voltage-balancing element 55 will short-circuit the energizing current for the coil in the event the voltage of the generator 5 is too high or too low. Upon the energization of its coil, the circuit-breaker 54' will be operated to couple the generator 5 to the power circuit 2, 3, 4, and in parallel relation to the generator 1.

The predetermined setting of the governor mechanism 8 will be changed to one corresponding with the speed at which the generators are synchronized. This latter setting is made concurrently with the paralleling of the generators under the control of the device 46 and the voltage-balancer 55. It will be appreciated that varying conditions will cause the coupling of the generator 5 in parallel relation to the generator 1 at varying frequencies and speeds. The described mechanisms will function to regulate the speed and the voltage of the auxiliary generator to bring them into step with the generator 1 quickly. The proportion of load thereafter taken by the generator 5 may be determined by readjusting the setting of the governor mechanism 8 by operating of the hand-wheel 14.

Modifications in the system and arrangement and location of parts may be made within the spirit and scope of our invention, and such modifications are intended to be covered by the appended claims.

We claim as our invention:—

1. The combination with a power circuit, a dynamo-electric machine, a prime mover therefor, switching means for connecting said machine to the power circuit, of control means therefor comprising a differential mechanism governed from said power circuit and said dynamo-electric machine, and a wound-rotor phase responsive means.

2. The combination with a power circuit, a dynamo-electric machine, switching means for connecting said machine to the power circuit, of control means comprising a differential mechanism governed from said power circuit and said dynamo-electric machine, and a wound rotor phase-responsive means for jointly controlling the operation of said switching means, and apparatus governed in accordance with the voltages of the power circuit and of the dynamo-electric machine adapted to also control said switching means.

3. The combination with a power circuit and a dynamo-electric machine, of means for connecting said machine to said circuit, control means therefor comprising a wound-rotor synchronizer operated in accordance with the phase indications of the respective currents and a device responsive to the respective voltages of said circuit and said machine and adapted to control a shunt circuit for said control means.

4. The combination with a power circuit and a dynamo-electric machine, of means for connecting said machine to said circuit, control means therefor comprising a wound-rotor synchronizer operated in accordance with the phase indications of the respective currents, a device responsive to the respective voltages of said circuit and said machine and adapted to control a shunt circuit for said control means, and means for regulating the speed of said machine.

5. The combination with two disconnected dynamo-electric machines, of means for connecting said machines together, and control means therefor comprising contact mechanism governed in accordance with the balancing of the voltages of the respective circuits of said machines, and additional contact mechanism governed in accordance with the balancing of the speeds of the machines, the energizing circuit of said control means including both of said contact mechanisms.

6. The combination with a power circuit and a dynamo-electric machine, of means for connecting said machine to said circuit, and control means therefor comprising contact mechanism, rotary means adapted to balance the phase relation of said circuit and said machine, and means adapted to balance the voltages of said circuit and said machine.

7. The combination with a power circuit and a dynamo-electric machine, of means for connecting said machine to said circuit and control means therefor comprising contact mechanism, a dynamo-electric machine adapted to control said mechanism in accordance with the balancing of the phase relation of said circuit and said machine, means adapted to balance the voltages of said circuit and said machine, and anti-hunting means co-operating with said control means.

8. The combination with a power circuit and a dynamo-electric machine, of means for connecting said machine to said circuit and control means therefor comprising contact mechanism, means adapted to balance the phase relation of said circuit and said machine, means for governing the speed of said dynamo-electric machine in accordance with an indication of said power circuit, said contact mechanism being controllable by said phase balancing means and said speed governing means, means adapted to balance the voltages of said circuit and said machine, and anti-hunting means co-operating with said control means.

9. The combination with a power circuit and a dynamo-electric machine, of means for connecting said machine to said circuit and control means therefor comprising contact mechanism, rotary means adapted to balance the phase relation of said circuit and said machine, means for governing the speed of said dynamo-electric machine in accordance with an indication of said power circuit, anti-hunting means co-operating therewith, said contact mechanism being subject to the operation of said rotary and said speed governing means, means adapted to balance the voltages of said circuit and said machine, and anti-hunting means co-operating therewith.

10. The combination with a power circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, a dynamo-electric machine operating as a synchronizer and controlling contact mechanism in accordance with the phase coincidence of the respective currents of said circuit and said machine, said contact mechanisms being connected in series relation, and means controlled in accordance with the voltages of said circuit and said machine and adapted to control a shunt circuit for said connecting means.

11. The combination with a motor circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, a portion of said contact mechanism being mounted upon a pivoted lever arm, an electromagnet carried by said arm and adapted to be energized in accordance with the counter-electromotive force of said governor motor, a rotary synchronizer having contact mechanism that is controlled in accordance with the phase coincidence of the respective currents of said circuit and said machine, and an electromagnet governed by said contact mechanisms and adapted to control the energization of said connecting means.

12. The combination with a power circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, means co-operating with a portion of said contact mechanism and adapted to move the same proportional to the ratio of adjustments initiated by said contact mechanisms, a synchronizer that is controlled in accordance with the phase coincidence of the respective currents of said circuit and said machine and adapted to also control said governor motor, electro-responsive means also governed by said contact mechanism to control the operation of said connecting means, and other means operating in accordance with the voltages of said circuit and said machine to control a shunt circuit for said connecting means.

13. The combination with a power circuit, a dynamo-electric machine, a prime mover therefor, and a speed governor for said prime mover, of means for connecting said machine to said circuit, and control means comprising a synchronizer controlled in accordance with the phase indications of the respective currents of said circuit and said machine, and a differential controlled from said circuit and said machine, said devices co-operating to control the operation of said connecting means and said governor and the regulation of said machine.

14. The combination with a plurality of dynamo-electric machines, a prime mover for one of said machines, a governor therefor, a motor for controlling said governor, and reversing switches for said motor, of means for coupling said machines, and control means for said coupling means and said reversing switches, said control means comprising differential mechanism, synchronous motors respectively connected to said machines for operating said differential mechanism, a synchronizer operated in accordance with the current indications of said machines, contact mechanism controlled thereby, and an electromagnet controlled by the operation of said reversing switches.

15. The combination with a power circuit and a dynamo-electric machine, of regulating means for said machine comprising differential mechanism operated from said circuit and said machine and adapted to adjust the speed of operation of said machine, contact mechanism controlled thereby, electroresponsive means adapted to regulate the excitation of said machine proportional to the voltage of said circuit, electroresponsive means adapted to control additional contact mechanism proportional to the current of said circuit, and means governed by the conjoint action of said contact mechanisms to connect said machine to said power circuit.

16. The combination with a plurality of dynamo-electric machines, one of which is to be put in parallel operation with the other of said machines, of means for governing the speed of the first machine and having other means for rendering the action of said speed-governing means more rapid, means for governing the voltage of the first machine and having other means co-operating therewith to render the action of said voltage-governing means more rapid, and a dynamo-electric machine for connecting said machines together in accordance with the current indications of the circuits of said machines, all of said means co-operating to parallel said machine when the respective voltages, currents and speeds substantially coincide.

17. The combination with a plurality of dynamo-electric machines adapted to be connected in parallel relation, of means for controlling such connection comprising differential mechanism operated from each of said machines, co-operating contact members controlled thereby, electroresponsive means adapted to prematurely open the contact members closed by said differential mechanism, a synchronizer operated in accordance with the current indications of the respective machines and controlling the circuit to said contact members, and a regulator comprising contact members, electroresponsive means for controlling said contact members proportional to the voltages of said machines, and means adapted to prematurely open the contact members closed by said electroresponsive means.

18. The combination with a power circuit, a dynamo-electric machine and means adapted to connect said machine to said circuit, of means for regulating the operation of said machine so that certain of its electrical characteristics will correspond with those of said power circuit, and an electromagnet controlled by said regulating means and adapted to energize said connecting means.

19. The combination with a power circuit, a dynamo-electric machine connected thereto and means adapted to connect said machine to said circuit, of means for regulating the operation of said machine comprising a speed responsive device, a phase responsive device and contact mechanism controlled thereby, and electroresponsive means having a retarded operation and adapted to control the operation of said connecting means.

20. The combination with a power circuit, a dynamo-electric machine and means adapted to connect said machine to said circuit when certain electrical characteristics thereof coincide, of control means therefor comprising a speed responsive device, a voltage phase responsive device, contact mechanism controlled thereby, and means for rendering the action of said contact mechanism dead beat, said control means being adapted to energize said connecting means after a predetermined time interval.

21. The combination with a power circuit, a dynamo-electric machine, and means adapted to connect said machine to said power circuit, of control means therefor having a time element in its operation, said control means comprising a speed responsive device, a voltage phase responsive device, a voltage balancing device, and anti-hunting means co-operating therewith.

22. The combination with a power circuit, a dynamo-electric machine, and means adapted to connect said machine to said circuit when certain electrical characteristics thereof coincide, of control means therefor comprising a speed responsive means, contact mechanism controlled thereby, a phase responsive means adapted to control the circuit to said contact mechanism, a voltage balancing means, contact mechanism controlled thereby, and anti-hunting means for each of said control mechanisms.

23. The combination with a power circuit, a dynamo-electric machine and means adapted to connect said machine to said circuit when said machine and said circuit have certain similar characteristics, of regulating means for said machine, said means comprising a frequency indicator adapted to rapidly control the speed of said machine, electroresponsive means adapted to control the circuit to said speed indicator in accordance with the phase relation of the respective voltages of said machine and said circuit, and means adapted to regulate the voltage of said machine, said means being controlled in accordance with the respective voltages of said machine and said circuit.

24. The combination with two disconnected dynamo-electric machines and means for connecting said machines together, of means for regulating one of said machines, said means comprising contact mechanism controlled in accordance with the frequencies of the respective machines, said contact mechanism also being controlled in accordance with the phase relation of the respective machines, and contact mechanism controlled in accordance with the voltages of the respective machines, said mechanisms also conjointly controlling the operation of said connecting means.

25. The combination with two disconnected dynamo-electric machines and means for connecting said machines together, of means for regulating one of said machines, said means comprising contact mechanism controlled in accordance with the frequencies of the respective machines, contact mechanisms controlled in accordance with the phase relation of the respective machines, contact mechanism controlled in accordance with the voltages of the respective machines, and anti-hunting mechanism co-operating with said regulating means, said mechanisms also conjointly controlling the operation of said connecting means.

26. The combination with two disconnected dynamo-electric machines, of means for regulating one of said machines, said means comprising contact mechanism controlled in accordance with the phase relation and the frequencies of the currents of the respective machines, and additional contact mechanism controlled in accordance with the voltages of the respective machines.

27. The combination with two disconnected dynamo-electric machines, of means for regulating one of said machines, said means comprising contact mechanism controlled in accordance with the phase relation and the frequencies of the currents of the respective machines, additional contact mechanism controlled in accordance with the voltages of the respective machines, and anti-hunting means co-operating therewith.

28. The combination with a power circuit, a dynamo-electric machine, a prime mover therefor, means for governing the operation of said prime mover and switching means for connecting said machine to the power circuit, of control means comprising a differential mechanism governed from said power circuit and said dynamo-electric machine, wound-rotor phase-indicating means adapted to control the energizing circuit for said switching means, apparatus governed in accordance with the voltages of the power circuit and of the dynamo-electric machine and adapted to also control the energizing circuit for said switching means, and means for initiating the action of said control means.

29. The combination with a power circuit and a dynamo-electric machine, of means for connecting said machine to said circuit, control means therefor comprising a wound-rotor synchronizer operated in accordance with the phase indications of the respective currents, a device responsive to the respective voltages of said circuit and said machine and adapted to control a shunt circuit for said control means, means for regulating the speed of said machine, and means for initiating the action of said control means.

30. The combination with a power circuit and a dynamo-electric machine, of means for connecting said machine to said circuit and control means therefor comprising contact mechanism, a dynamo-electric machine adapted to control said mechanism in accordance with the balancing of the currents of said circuit and said machine, means adapted to balance the voltages of said circuit and said machine, anti-hunting means co-operating with said control means, and means for initiating the action of said control means.

31. The combination with a power circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, a dynamo-electric machine operating as a synchronizer, contact mechanism controlled thereby in accordance with the phase coincidence of the respective currents of said circuit and said machine, said contact mechanisms being connected in series relation, means controlled in accordance with the voltages of said circuit and said machine and adapted to control a shunt circuit for said connecting means, and means for initiating the action of said control means.

In testimony whereof, we have hereunto subscribed our names this 12th day of July, 1922.

WILLIAM M. BRADSHAW.
JOHN H. ASHBAUGH.